United States Patent [19]

Blass et al.

[11] Patent Number: 4,729,402
[45] Date of Patent: Mar. 8, 1988

[54] COMPRESSOR VALVE NOISE ATTENUATION

[75] Inventors: Jaroslav Blass, Sidney; Timothy S. Quellhorst, New Bremen, both of Ohio

[73] Assignee: Copeland Corporation, Sidney, Ohio

[21] Appl. No.: 892,754

[22] Filed: Aug. 1, 1986

[51] Int. Cl.$^4$ ............................................... F16K 21/10
[52] U.S. Cl. ...................... 137/514.5; 137/514; 137/543.17; 137/543.19; 417/567
[58] Field of Search .................... 137/543.15, 543.17, 137/516.17, 516.15, 516.19, 516.21, 516.23, 543.19, 514, 514.5; 417/296, 274–277, 440, 567

[56] References Cited

U.S. PATENT DOCUMENTS

| | | | |
|---|---|---|---|
| 4,329,125 | 5/1982 | Chambers | 137/543.17 X |
| 4,368,755 | 1/1983 | King | 137/543.17 X |
| 4,408,629 | 10/1983 | Lafont | 137/543.15 X |
| 4,445,534 | 5/1984 | King | 137/543.17 X |
| 4,450,860 | 5/1984 | Francis et al. | 137/543.19 |
| 4,469,126 | 9/1984 | Simpson | 137/543.19 |
| 4,470,774 | 9/1984 | Chambers | 137/543.19 X |
| 4,478,243 | 10/1984 | King | 137/543.17 X |
| 4,543,989 | 10/1985 | Lorson | 137/543.19 |
| 4,548,234 | 10/1985 | Prenger | 137/543.19 |

Primary Examiner—Alan Cohan
Assistant Examiner—John Rivell
Attorney, Agent, or Firm—Harness, Dickey & Pierce

[57] ABSTRACT

An improved valve assembly is disclosed, in which the valve assembly is provided with noise attenuation and is especially well-suited for use in refrigeration compressors. The valve assembly includes a retainer member fixed to a valve plate having a flow opening therethrough with a movable valve member therein between the retainer member and the valve plate. The retainer member edges are spaced relatively close to the valve plate to define a relatively small effective flow area therebetween, with additional effective flow area being provided by one or more openings through the valve plate. This arrangement provides for rapid fluid pressurization in the area between the valve member and the retainer member during valve opening in order to minimize impact forces transmitted from the valve member to the retainer member, thereby reducing noise emanating from the valve assembly.

17 Claims, 5 Drawing Figures

COMPRESSOR VALVE NOISE ATTENUATION

BACKGROUND AND SUMMARY OF THE INVENTION

The present invention relates generally to pressure responsive valve assemblies having provision for noise attenuation. More particularly, the present invention relates to such valve assemblies adapted for use in refrigeration compressors.

Refrigeration compressors typically include pressure-actuated suction and discharge valving mounted generally in a wall of the compression chamber. It is critical to the overall operation of such a compressor to provide a sufficiently large port area to permit the flow of a maximum volume of gas within a given time period, at an acceptably small pressure drop. This concept is particularly important for refrigeration compressors employed in air conditioning systems because of the relatively high mass flow rates generally required in such systems.

In addition to maximizing the port area for a given compressor size, it is important and advantageous to reduce the weight of a moving valve member, thereby limiting the inertia effect thereof, as well as minimizing the operating noise of the valve assembly, especially in high speed compressors. In such gas compressors, it is also important to the efficiency and overall performance of the refrigeration system to minimize the reexpansion or clearance volume. Accordingly, the valving and the compression chamber wall should be configured to have a shape complementary with that of the piston, in order to reduce the volume of the compression chamber to a minimum during the reexpansion stroke without restricting gas flow. The reduction of such reexpansion volume is also greatly important in refrigeration compressors having relatively low mass flow rates, such as those frequently employed in very low temperature refrigeration systems, as well as in heat pump applications.

Examples of compressor valve assemblies calculated to address the design and performance objectives discussed above are shown in U.S. Pat. Nos. 4,329,125; 4,368,755; 4,385,872; 4,445,534; 4,450,860; 4,469,126; 4,470,774; 4,478,243; 4,543,989; and 4,548,234; as well as copending U.S. patent applications Ser. No. 714,011, filed Mar. 22, 1985, and Ser. No. 788,773, filed Oct. 18, 1985, all of which are assigned to Copeland Corporation, the assignee of the present invention, and the disclosures of which are hereby incorporated by reference herein.

Although the compressor apparatuses and valve assemblies disclosed and described in the above-mentioned U.S. Patents and copending application have superior performance and represent great advancements in the art, increasing emphasis on noise control in recent years has lead to the desirability of even further refinements in such machines in the area of noise reduction.

Traditional noise treatment approaches have frequently focused on the controlling of vibrations of the outer structure of a noise-producing device, either by way of stiffening the outer structure or related components, or by vibration damping treatments. Such approaches may be effective in structures having relatively light outer structural shells, but are frequently prohibitive because of high production costs and durability problems that frequently outweigh the improvement in noise reduction.

Another conventional approach to noise treatment involves the application of acoustical enclosures or blankets around, or the installation of mufflers on, noise-producing devices. These approaches frequently offer the advantage of a quick and relatively simple solution to noise problems, but often suffer the disadvantages of inconsistency of noise suppression performance due to enclosure leakage, interference of acoustical enclosures or blankets with the operation of the device, interference and inconvenience associated with maintenance of the device, and relatively high material costs.

As a result of the above-discussed disadvantages in conventional noise treatment approaches, more emphasis has recently been placed upon noise reduction at the fundamental source of the noise within a device or mechanism. This approach is even more desirable and advantageous when new products are being developed so that the problem of noise reduction can be addressed during the design stage. In the context of the present invention, this approach is directed to reducing noise at the noise source itself, i.e. in a valve assembly having a valve plate with an opening and a movable valve member disposed generally within the valve plate opening. Such a valve assembly also includes a retainer member fixedly connected to the valve plate and at least in part spaced therefrom such that the movable valve member is disposed between the valve plate and the retainer member. This approach to noise reduction in such a valve assembly is especially critical, since any improvement in noise reduction must be optimized in view of its effect upon the overall performance and efficiency of the gas compressor.

According to the present invention, an improved valve assembly including optimized noise attenuation includes a valve plate with a valve plate opening therethrough having a wall defining a valve seat. A valve member is associated with the valve seat and is movable between a closed position sealingly engaging the valve seat to prevent the flow of a fluid through the valve plate opening and an open position in which the movable valve member is spaced away from the valve seat to permit such fluid flow through the valve plate opening. A retainer member is fixedly connected to the valve plate and is at least in part spaced away from the valve plate to define a retainer chamber, and the movable valve member is disposed between the valve plate and the retainer member within the retainer chamber. The invention resides in providing the retainer member with a plurality of restricted flow openings extending therethrough to permit controlled flow of fluid from the retainer chamber when the valve member opens. Preferably, the retainer member substantially covers the valve plate opening, with only a minimal space, if any, between the outer peripheral edge of the retainer member and the outer peripheral edge of the valve plate opening.

The basic approach to noise reduction taken by the present invention focuses on reducing noise resulting from the impact of the movable valve member at maximum open displacement with the retainer member, or other components therebetween, which is transmitted through to the overall structure of the compressor and is frequently amplified as it radiates to the rest of the compressor's structure. The present invention seeks to overcome or at least minimize noise generated or transmitted by such impact by very quickly pressurizing the space between the movable valve member and the retainer member at the initial stage of valve opening. Such rapid pressurization of the retainer space tends to create a fluid pressure "cushion" that at least slows down the moving valve member near the end of its opening movement and thus eliminates or at least substantially minimizes the impact transmitted from the valve member to the retainer member.

In contrast to conventional wisdom, the approach of the present invention, wherein the outer peripheral spacing between the retainer member and the valve plate opening is minimized, has been empirically found to be vastly superior to that of prior valve assembly designs, wherein the retainer member was configured to be relatively narrow in order to provide a relatively large flow area between the retainer member periphery and the outer edge of the valve plate opening. Therefore, in contrast to such previous constructions, the present invention seeks to provide the above-mentioned fluid pressure cushion by minimizing the gap between the retainer member periphery and the outer edge of the valve plate opening and by providing controlled fluid communication for such fluid pressure cushioning by way of a plurality of openings through the retainer to permit the flow of fluid into the retainer chamber between the valve member and the retainer member.

The present invention also seeks to provide an optimum relationship between the retainer peripheral flow area and the size, location and number of the sound attenuation openings through the retainer member, thus providing an optimum relationship between noise attenuation and compressor efficiency. The invention provides such an optimized relationship between noise attenuation and efficiency in valve assemblies of various types, which include light-weight and quick-acting valve members in high-efficiency compressors adapted for minimizing the reexpansion or clearance volume at the valve end of the compression chamber.

Additional objects, advantages and features of the present invention will become apparent from the following description and the appended claims, taken in conjunction with the accompanying drawings.

DETAILED DESCRIPTION OF THE PREFERRED EMBODIMENTS

Figure 1:
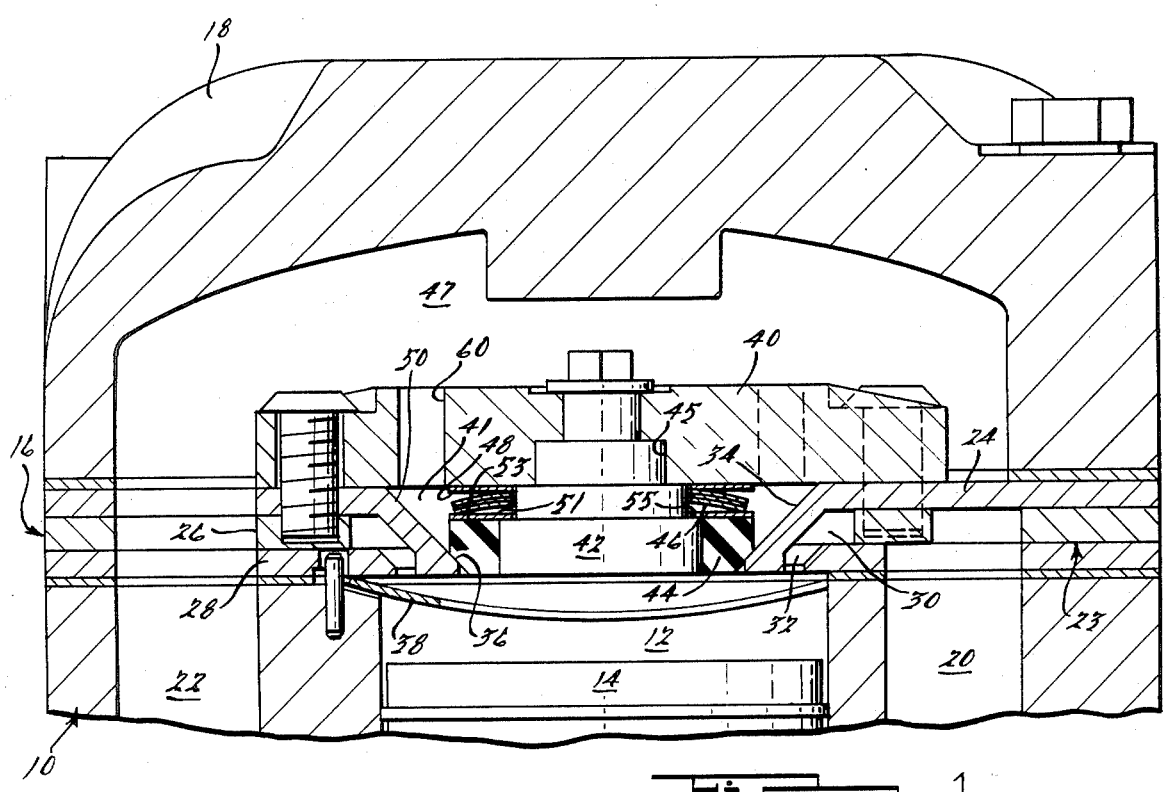
FIG. 1 is a partial cross-sectional view of a reciprocating gas compressor apparatus including a lightweight, quick-acting valve assembly with noise attenuation according to the present invention.

FIGS. 1 through 4 illustrate exemplary embodiments of improved valve assemblies of the present invention employed in reciprocating gas compressors. However, as will become apparent from the following discussion and the accompanying drawings, the improved valve assembly of the present invention is equally applicable in other fluid flow devices, as well as in compressor or heat pump devices other than those shown in the drawings, such as in rotary or scroll-type compressors. The invention also finds applicability in either discharge or suction valve assemblies.

Figure 2:
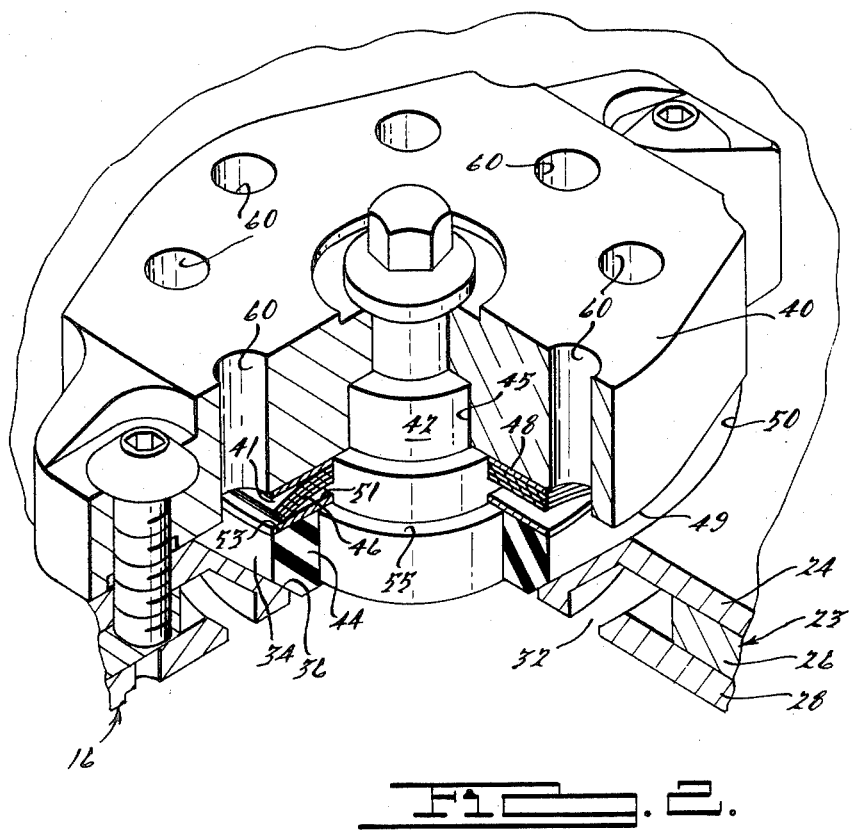
FIG. 2 is a partial perspective view, partially cut away, of the valve assembly of the gas compressor shown in FIG. 1.

In FIGS. 1 and 2, an exemplary compressor housing 10 includes a compression chamber defined by a cylinder 12, with a reciprocating piston 14 disposed therein. A valve assembly 16, in accordance with the present invention, and a head 18 are secured in an overlying relationship with the cylinder 12. The compressor housing 10 also includes both suction and discharge gas passages 20 and 22, respectively, for conveying fluid to and from the cylinder 12.

The valve assembly 16 includes a three-piece valve plate assembly 23, including an upper plate 24, an intermediate plate 26, and a lower plate 28, which are secured together by any of the number of known methods and which cooperate to define a suction gas chamber 30, a suction gas inlet passage 32, a discharge gas passage 34 that extends through the valve plate assembly 23 and has a wall defining a discharge valve seat 36. A ring-type suction valve 38 is shown in an open position in FIG. 1 and seats against the lower surface of the lower plate 28 of the valve plate assembly 23. The valve assembly 16 also includes a retainer member 40 fixedly secured to the valve plate assembly 23 and at least in part spaced away from the upper plate 24 of the valve plate assembly 23 in the area of the discharge gas passage 34 in order to define a retainer chamber 41. A neck member 42 is disposed within the discharge gas passage 34, extends through a neck opening 45 in the retainer member 40, and is fixedly secured to the retainer member 40.

The valve assembly 16 further includes a discharge valve member 44 disposed within the the retainer chamber 41 for sliding movement on the neck member 42 between a closed position engaging the discharge valve seat 36 and an open position spaced away from the discharge valve seat 36 to permit flow of gas from the cylinder 12, through the discharge gas passage 34, and into a discharge plenum 47.

A resilient sealing member 51 also generally surrounds the neck member 42 and sealingly engages annular sealing surfaces 53 and 55 on the discharge valve member 44 and the neck member 42, respectively. A leaf-type biasing spring 46, which is preferably of a partial cylindrical configuration, is also disposed within the retainer chamber 41 and generally surrounds the neck member 42 in order to biasingly bear against the sealing member 51, the discharge valve member 44, and a wear plate 48 for resiliently biasing the discharge valve member 44 toward its closed position. A discharge valve assembly generally of the type shown in the drawings is also disclosed and described in the above-mentioned copending application Ser. No. 714,011, filed Mar. 22, 1985.

In the preferred embodiment, the retainer edges 49 of the retainer member 40 are spaced relatively close to the outer peripheral edge 50 of the discharge gas passage 34 to reduce the effective flow area therebetween. The retainer member 40 also includes a plurality of retainer openings 60 extending therethrough. As can be seen in FIGS. 1 and 2, the flow areas between the edges 49 and 50, and through the retainer openings 60, form parallel flow paths from the gas passage 34. Similar parallel flow paths are formed in the embodiments shown in FIGS. 3 through 5. As discussed above, it is has been empirically found that such reduction of the effective flow area between the retainer edges 49 and the valve plate assembly, coupled with the provision of a number of the retainer opening 60, function to very rapidly pressurize the retainer chamber 41 with discharge gas substantially immediately upon opening movement of the discharge valve member 44. Such quick pressurization of the retainer chamber 41 has been found to provide a gas "cushion" that tends to decelerate and resist the upward movement of the discharge valve member 44 near the end of its opening movement. This gas cushion eliminates or minimizes the impact of the discharge valve member 44 transmitted through the biasing spring 46, the wear plate 48, and the retainer member 40 to the remainder of the compressor structure, thereby greatly attenuating compressor noise emanating from the valve assembly 16.

As one skilled in the art will readily recognize, the reduction of the effective flow area between the retainer member edges 49 and valve plate assembly 23 can have a substantial effect upon the efficiency of the compressor. However, tests of actual prototype compressor discharge valve assemblies have revealed that the efficiency of the gas compressor and the sound attenuation in a valve assembly construction according to the present invention can be optimized, and actually improved, by appropriately selecting the retainer member size, as well as the number and size of the retainer member openings. In a test compressor, in which such optimization was actually empirically achieved, eight of the retainer openings 60 were provided in a circumferentially-spaced relationship through the retainer member 40, which was approximately 2.38 inches wide at the widest point between the retainer edges, with each of the retainer openings 60 being cylindrical in shape and having a radius of approximately 0.25 inches. This resulted in a total effective flow area of the retainer openings 60 of approximately 1.57 square inches. When coupled with an effective flow area between the retiner edges 49 of the retainer member 40 and the valve plate assembly 23 of approximately 0.225 square inches, the retainer openings 60 resulted in a total effective flow area of approximately 1.795 square inches. This arrangement resulted in an Energy Efficiency Ratio (EER) of approximately 5.19 BTU/Watt and a Sound Power Level of approximately 83.4 dbA, with a compressor capacity of approximately 43,852 BTU/Hour.

When compared with compressor valve assemblies of a previous design, in which the effective flow area between the retainer member and the valve plate assembly was approximately 1.152 square inches, and wherein no retainer openings were provided through the retainer member, the Energy Efficiency Ratio was increased by approximately 2%, and the Sound Power Level was decreased by approximately 3.6 dbA, with approximately an 4.3% increase in compressor capacity. Perhaps more significantly, from the standpoint of noise attenuation, this resulted in a significant decrease in the pressure differential between the cylinder pressure and the pressure in the retainer chamber 41, and the pressure pulsation within the cylinder 12, which in turn resulted in a very significant decrease in the vibration of the retainer member 40 during opening of the discharge valve member 44. This effect is believed to be due to the cushioning or deceleration effect on the discharge valve member 44 at least near the end of its opening movement, thereby eliminating or at least substantially minimizing the impact force transmitted from the discharge valve member 44 to the retainer member 40. Since this impact force was substantially decreased, the vibration and noise transmitted to the remainder of the compressor structure was correspondingly decreased.

Figure 3:
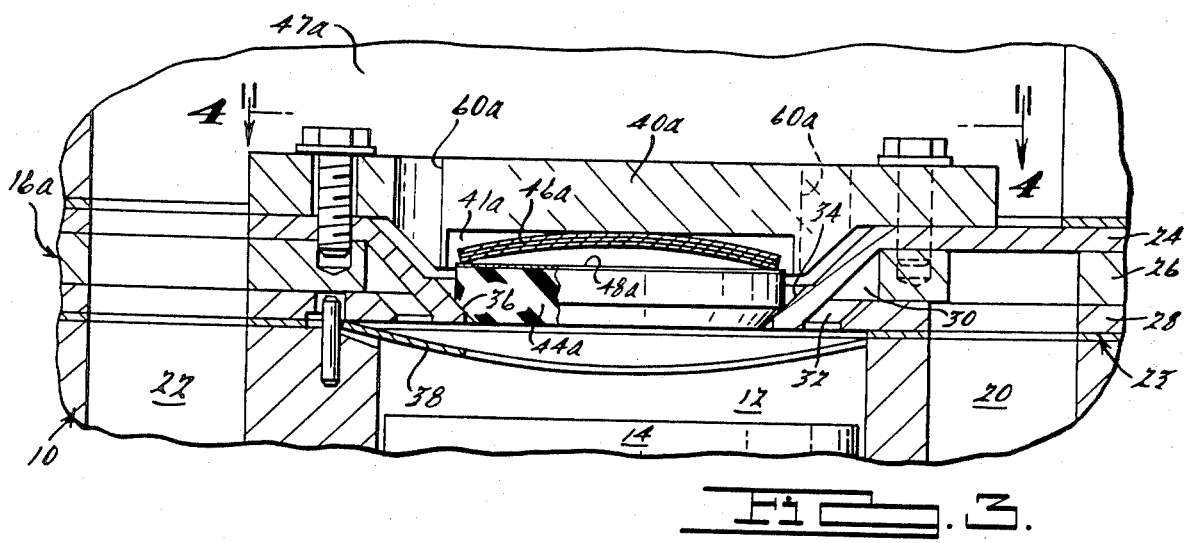
FIG. 3 is a cross-sectional view similar to that of FIG. 1, but illustrating the application of the noise attenuation feature of the present invention in an alternate valve assembly construction.
Figure 4:
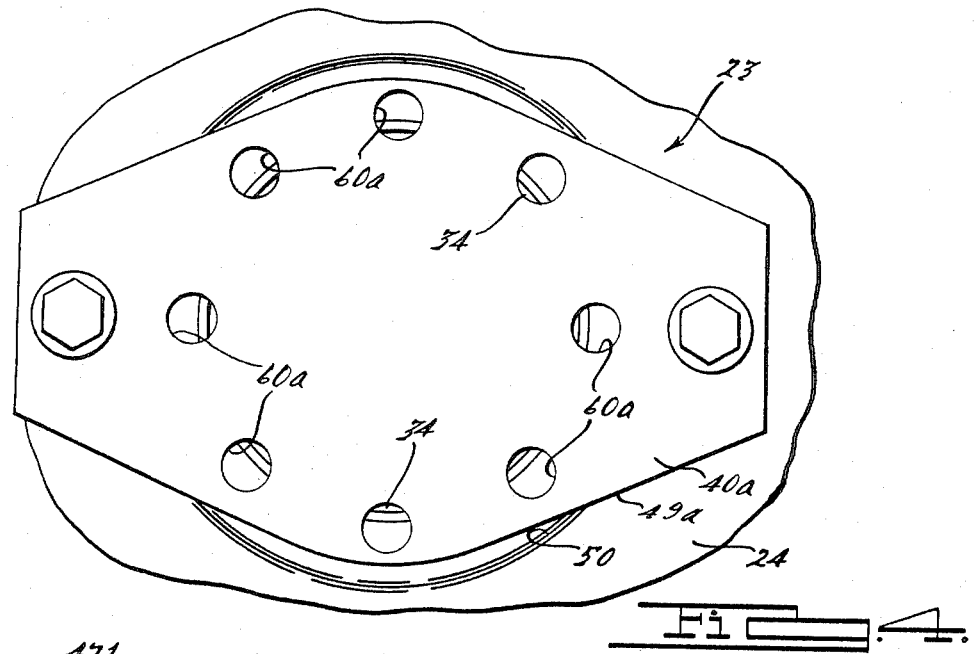
FIG. 4 is a top plan view of the valve assembly of FIG. 3.

The above-discussed principles of the present invention are also equally applicable to various valve assemblies other than the discharge valve assembly 16 shown in FIGS. 1 and 2, which has an arrangement including the neck member 42. As an example of such other applications of the present invention, FIGS. 3 and 4 illustrate a compressor discharge valve assembly 16a, which is essentially similar in most respects to the valve assembly 16 discussed above in connection with FIGS. 1 and 2. The valve assembly 16a, however, includes a retainer member 40a that does not include a neck member extending through an opening in the retainer member. Similarly, the leaf-type biasing spring 46 of FIGS. 1 and 2 is replaced by the leaf-type biasing spring 46a in FIGS. 3 and 4, which resiliently biases a discharge valve member 44a toward its closed position. A similar valve assembly (except for the provision of the retainer holes 60a) is described and disclosed in U.S. Pat. Nos. 4,469,126 and 4,543,989, mentioned above. In all other respects, the valve assembly 16a shown in FIGS. 3 and 4 functions in a manner substantially similar to that described above in connection with FIGS. 1 and 2.

Figure 5:
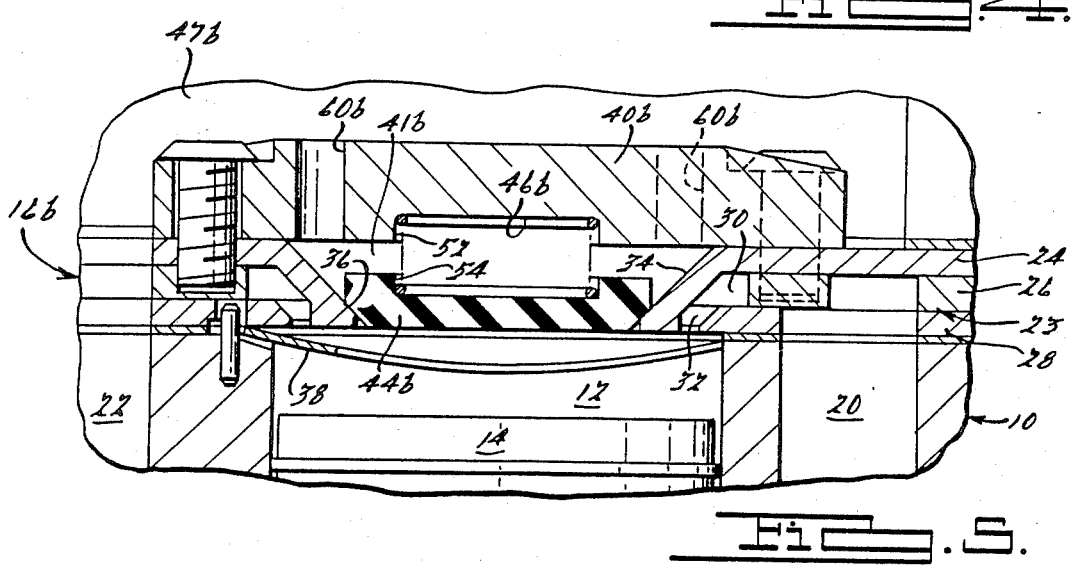
FIG. 5 is a cross-sectional view similar to that of FIGS. 1 and 3, but illustrating the application of the noise attenuation feature of the present invention in still another alternate valve assembly construction.

An example of another application of the present invention is illustrated in FIG. 5, which also does not include a neck member 42 such as that shown in FIGS. 1 and 2. In FIGS. 5, a retainer member 40b is at least in part spaced away from the valve plate assembly 23 to define a retainer chamber 41b, in which a discharge valve member 44b is resiliently biased toward its closed position by a coil-type spring 46b. Preferably, the biasing spring 46b is received within recesses 52 and 54 in the retainer member 40b and the discharge valve member 44b, respectively. In all other respects, the valve assembly 16b shown in FIG. 5 functions in a manner substantially similar to that described above in connection with FIGS. 1 through 4. Examples of a valve assembly of the type shown in FIG. 5 (but without the retainer openings 60) are shown in U.S. Pat. Nos. 4,368,755; 4,445,534; and 4,478,243; all of which are assigned to the same assignee as the present invention.

It should be emphasized that the above-described advantageous results, as well as the optimization of compressor efficiency versus sound attenuation, are obtainable in any of the embodiments shown in FIGS. 1 through 5, as well as in other valve assembly applications.

The foregoing discussion discloses and described exemplary embodiments of the present invention. One skilled in the art will readily recognize from such discussion, and from the accompanying drawings, that various changes, modifications and variations may be made therein without departing from the spirit and scope of the invention as defined in the following claims.

We claim:

1. An improved valve assembly comprising:
   a valve plate having a valve plate opening therethrough, said valve plate opening having a wall defining a valve seat;
   a valve member movable between a closed position engaging said valve seat to prevent flow of a fluid through said valve plate opening and an open position spaced away from said valve seat to permit flow of the fluid through said valve plate opening; and a retainer member fixed with respect to said valve plate and at least in part spaced therefrom to define a retainer chamber therebetween and to define a first predetermined restricted flow area therebetween, said valve member being disposed in said retainer chamber, said retainer member having a plurality of retainer openings therethrough to permit parallel flow of the fluid through said retainer openings and said first predetermined restricted flow area during opening movement of said valve member away from said valve seat toward said retainer member, said retainer openings collectively defining a flow area which is sufficiently smaller than the area of said retainer member to define a second predetermined restricted flow area tending to restrict the flow of the fluid from said retainer chamber during said opening movement of said valve member, said second restricted flow area being greater than said first restricted flow area, said restricted fluid flow tending to dampen said opening movement of said valve member and thereby minimize the force of any impact between said valve member and said retainer member during said opening movement.

2. An improved valve assembly according to claim 1, wherein said retainer member substantially covers said valve plate opening.

3. An improved valve assembly according to claim 1, further comprising a neck member fixedly disposed in said valve plate opening, said valve member being slidably disposed on said neck member for said movement between said closed and open positions.

4. An improved valve assembly according to claim 3, further comprising a seal member for preventing flow of the fluid between said valve member and said neck member when said valve member is in said closed position.

5. An improved valve assembly according to claim 1, further comprising spring means disposed generally between said retainer member and said valve member for resiliently biasing said valve member toward said closed position.

6. An improved valve assembly according to claim 5, wherein said spring means comprises a leaf-type spring having a generally cylindrical shape.

7. An improved valve assembly according to claim 5, wherein said spring means comprises a coil spring.

8. An improved valve assembly comprising:
a valve plate having a valve plate opening therethrough, said valve plate opening having a wall defining a valve seat;
a valve member movable between a closed position engaging said valve seat to prevent flow of a fluid through said valve plate opening and an open position spaced away from said valve seat to permit flow of the fluid through said valve plate opening; and
a retainer member fixed with respect to said valve plate and at least in part spaced therefrom to define a retainer chamber therebetween, said valve member being disposed in said retainer chamber, said retainer member having a plurality of retainer openings therethrough to permit flow of the fluid therethrough during opening movement of said valve member away from said valve seat toward said retainer member, said retainer member including peripheral edges spaced relatively close to said valve plate to define a first effective flow area therebetween, said retainer openings defining a second effective flow area in parallel fluid flow relationship with respect to said first effective flow area, said second effective flow area being approximately seven times as large as said first effective flow area.

9. An improved valve assembly comprising:
a valve plate having a valve plate opening therethrough, said valve plate opening having a wall defining a valve seat;
a neck member fixedly disposed in said valve plate opening;
a valve member slidably disposed on said neck member and being movable between a closed position engaging said valve seat and an open position spaced from said valve seat, said valve member and said neck member each having an annular sealing surface thereon;
a seal member for preventing flow of a fluid between said valve member and said neck member when said valve member is in said closed position, said seal member sealingly engaging each of said annular sealing surfaces when said valve member is in said closed position; and
a retainer member fixed with respect to said valve plate and at least in part spaced therefrom to define a retainer chamber therebetween and to define a first predetermined restricted flow area therebetween, said valve member being disposed in said retainer chamber, said retainer member having a plurality of retainer openings therethrough for permitting parallel flow of the fluid through said retainer openings and said first predetermined restricted flow area during opening movement of said valve member away from said valve seat toward said retainer member, said retainer openings collectively defining a flow area which is sufficiently smaller than the area of said retainer member to define a second predetermined restricted flow area tending to restrict the flow of the fluid from said retainer chamber during said opening movement of said valve member, said second restricted flow area being greater than said first restricted flow area, said restricted fluid flow tending to dampen said opening movement of said valve member and thereby minimize the force of any impact between said valve member and said retainer member during said opening movement.

10. An improved valve assembly according to claim 9, wherein said retainer member includes peripheral edges spaced relatively close to said valve plate to define a first effective flow area therebetween, said retainer openings defining a second effective flow area, said second effective flow area being approximately seven times as large as said first effective flow area.

11. An improved valve assembly according to claim 10, wherein said valve assembly is a discharge valve assembly for a gas compressor adapted for use in a refrigeration system having a capacity of approximately 43,000 BTU/hour, said retainer member being approximately 2.38 inches wide between said peripheral edges, said first effective flow area being approximately 0.225 square inches, and said second effective flow area being approximately 1.57 square inches.

12. An improved valve assembly comprising:

a valve plate having a valve plate opening therethrough, said valve plate opening having a wall defining a valve seat;

a valve member movable between a closed position engaging said valve seat to prevent flow of a fluid through said valve plate opening and an open position spaced away from said valve seat to permit flow of the fluid through said valve plate opening; and a retainer member fixed with respect to said valve plate and at least in part spaced therefrom to define a retainer chamber therebetween, said valve member being disposed in said retainer chamber, said retainer member having peripheral edges spaced relatively close to said valve plate to substantially cover said valve plate opening and to define a first predetermined restricted flow area therebetween, said retainer member further having a plurality of retainer openings collectively defining a second predetermined restricted flow area in parallel fluid flow relationship with respect to said first effective flow area, said second restricted flow area being greater than said first restricted flow area, said first and second flow areas tending to restrict the flow of the fluid from said retainer chamber during said opening movement of said valve member to dampen said opening movement of said valve member and thereby minimize the force of any impact between said valve member and said retainer member during said opening movement.

13. An improved valve assembly according to claim 12, wherein said second flow area is approximately seven times as large as said first restricted flow area.

14. An improved valve assembly according to claim 12, wherein said valve plate opening and said retainer openings extend in longitudinal directions through said valve plate and said retainer member, respectively, said retainer openings being located laterally inboard of said peripheral edges of said retainer member.

15. An improved valve assembly according to claim 14, wherein said retainer openings are located laterally outboard of a laterally outer peripheral edge of said valve member.

16. An improved valve assembly according to claim 12, wherein each of said retainer openings defines a portion of said second restricted flow area, each of said portions being smaller than said first restricted flow area.

17. An improved valve assembly according to claim 12, wherein said plurality of retainer openings are disposed in a generally circular arrangement on said retainer member with circumferentially adjacent retainer openings being equally spaced from one another.

* * * * *